United States Patent [19]

Carrick

[11] Patent Number: 5,634,761
[45] Date of Patent: Jun. 3, 1997

[54] WEIGHT DISTRIBUTING HULL AND KEEL SUPPORT FOR BOAT TRAILER FRAMES

[75] Inventor: Larry K. Carrick, Spokane, Wash.

[73] Assignee: Calkins Manufacturing Company, Spokane, Wash.

[21] Appl. No.: 509,028

[22] Filed: Jul. 28, 1995

[51] Int. Cl.⁶ ........................................... B60P 3/10
[52] U.S. Cl. .................... 414/482; 280/414.1; 414/529
[58] Field of Search ........................... 414/471, 477, 414/482, 483, 529, 533, 534, 535; 280/414.1

[56] References Cited

U.S. PATENT DOCUMENTS

| | | | |
|---|---|---|---|
| 2,586,485 | 2/1952 | Schroeder | 414/534 |
| 2,975,916 | 3/1961 | Steber | 214/84 |
| 3,104,770 | 9/1963 | Calkins et al. | 214/84 |
| 3,155,249 | 11/1964 | Johnson | 214/84 |
| 3,175,710 | 3/1965 | Kistner | 214/84 |
| 3,228,543 | 1/1966 | Cowan | 214/84 |
| 3,756,439 | 9/1973 | Johnson | 214/84 |
| 3,812,986 | 5/1974 | Rogers | 414/534 |
| 3,888,367 | 6/1975 | Cox | 414/534 |
| 3,892,320 | 7/1975 | Moore | 214/84 |
| 3,917,087 | 11/1975 | Godbersen | 214/84 |
| 3,974,924 | 8/1976 | Ullman, Jr. | 280/414.1 X |
| 4,464,092 | 8/1984 | Chambers et al. | 414/534 |
| 4,560,316 | 12/1985 | Daniels | 414/529 X |
| 4,875,700 | 10/1989 | Monroe | 414/535 X |
| 4,875,701 | 10/1989 | Godbersen | 280/414.1 |
| 4,895,387 | 1/1990 | Hawkins et al. | 280/414.1 |
| 5,133,570 | 7/1992 | Godbersen | 414/532 X |
| 5,133,571 | 7/1992 | Urbank | 280/414.1 |
| 5,158,315 | 10/1992 | Godbersen | 280/414.1 |
| 5,255,933 | 10/1993 | Carrick | 280/414.1 |
| 5,292,145 | 3/1994 | Ostrand | 280/414.1 |
| 5,332,249 | 7/1994 | Solberg et al. | 414/477 X |

FOREIGN PATENT DOCUMENTS

| | | |
|---|---|---|
| 613439 | 1/1961 | Canada. |
| 708591 | 6/1966 | Italy. |

Primary Examiner—James W. Keenan
Attorney, Agent, or Firm—Wells, St. John, Roberts, Gregory & Matkin, P.S.

[57] ABSTRACT

In the present trailer, a pair of cross members are pivoted on the trailer frame about parallel horizontal fulcrum axes and extend transversely across a boat trailer frame. A keel receiver is provided on each cross member, extending to one side of the respective fulcrum axis. A pair of elongated bunk members extend longitudinally relative to the boat trailer frame, connected at ends to the two cross members such that the cross members are linked together by the elongated bunk members. A pair of elongated yokes are mounted at yoke pivots to the rearward cross member and extend longitudinally between forward and rearward yoke ends. A pair of short bunk members are mounted to the pair of elongated yokes on a transverse short bunk pivot axis that are transverse to the boat trailer frame.

20 Claims, 13 Drawing Sheets

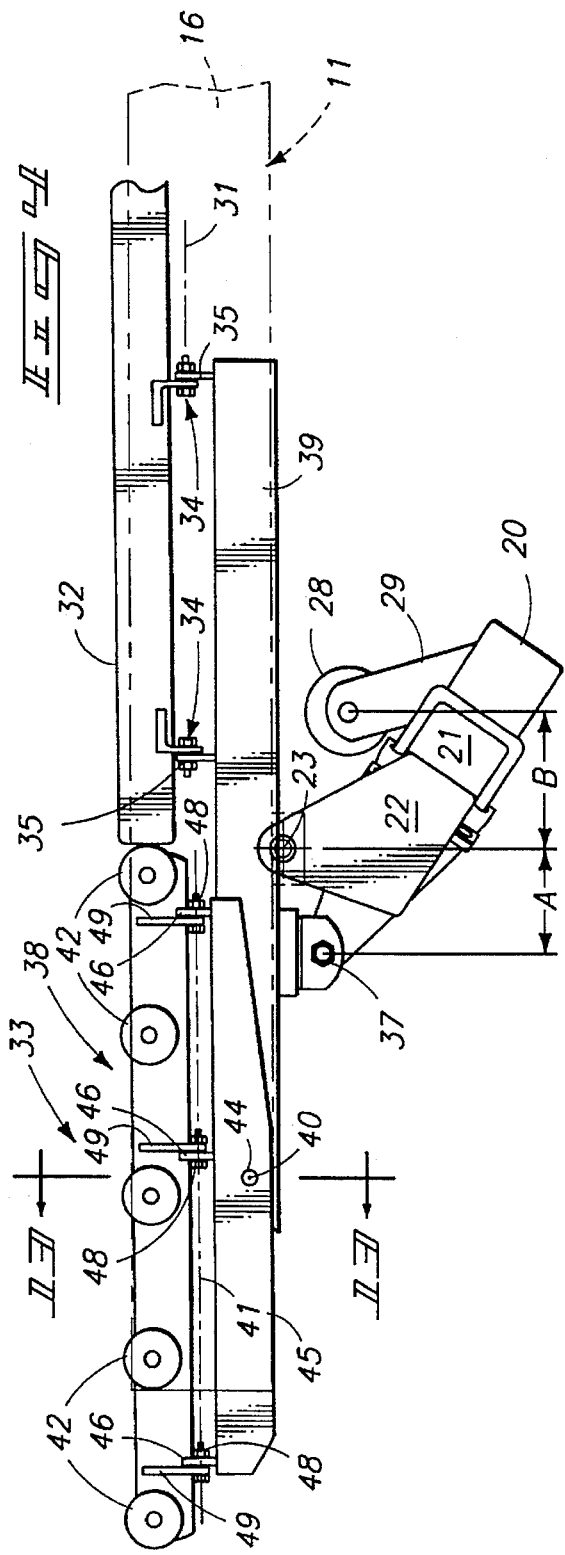
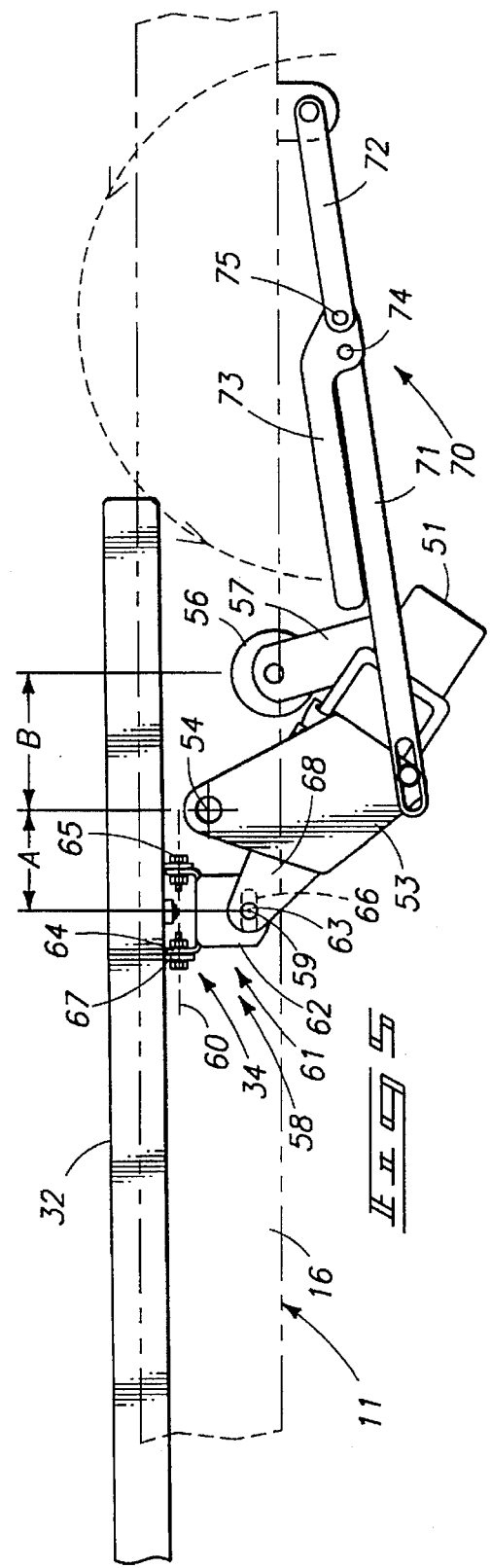

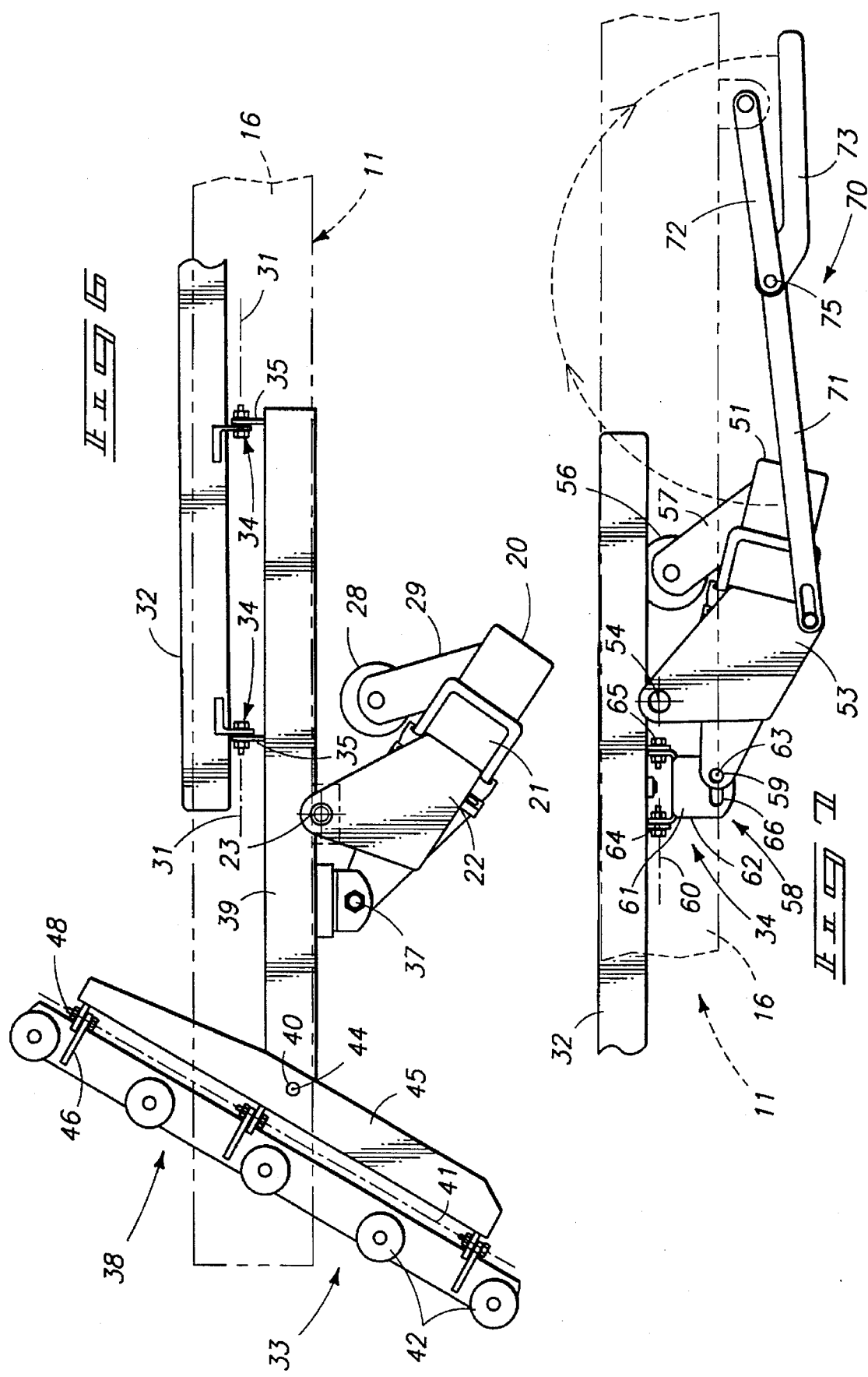

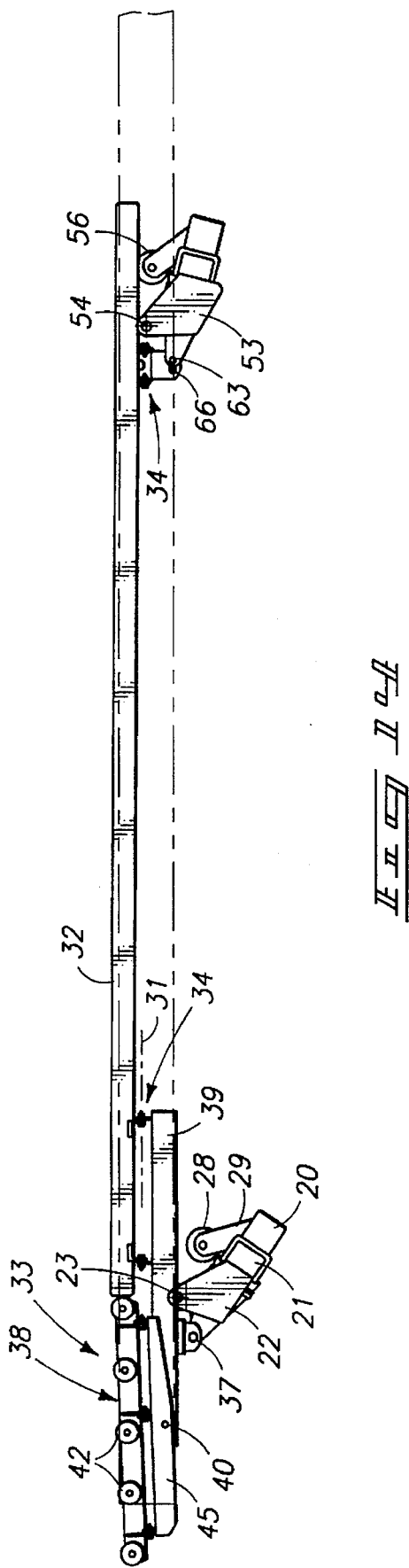

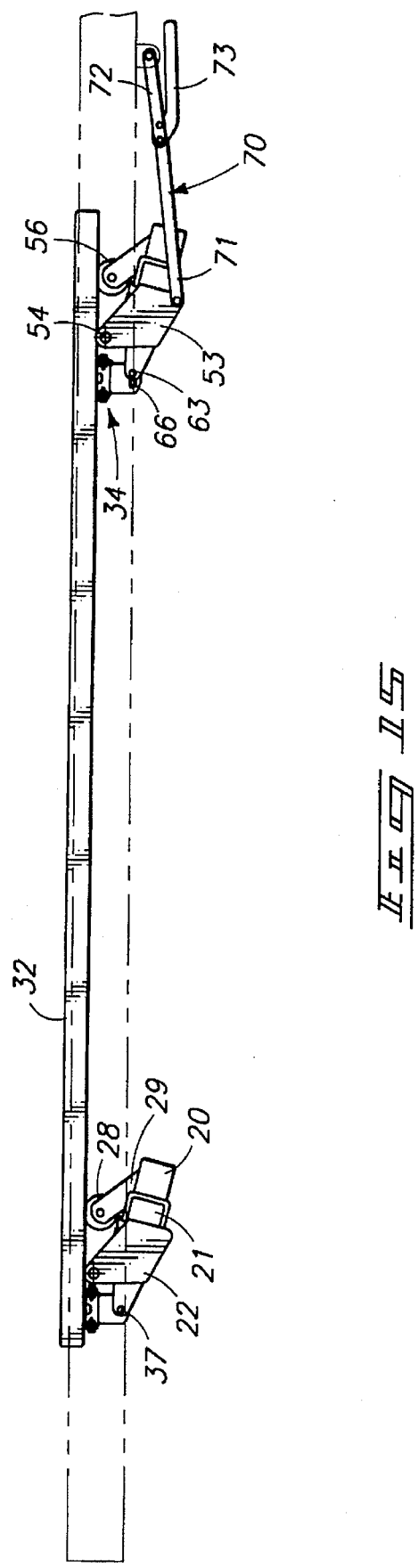

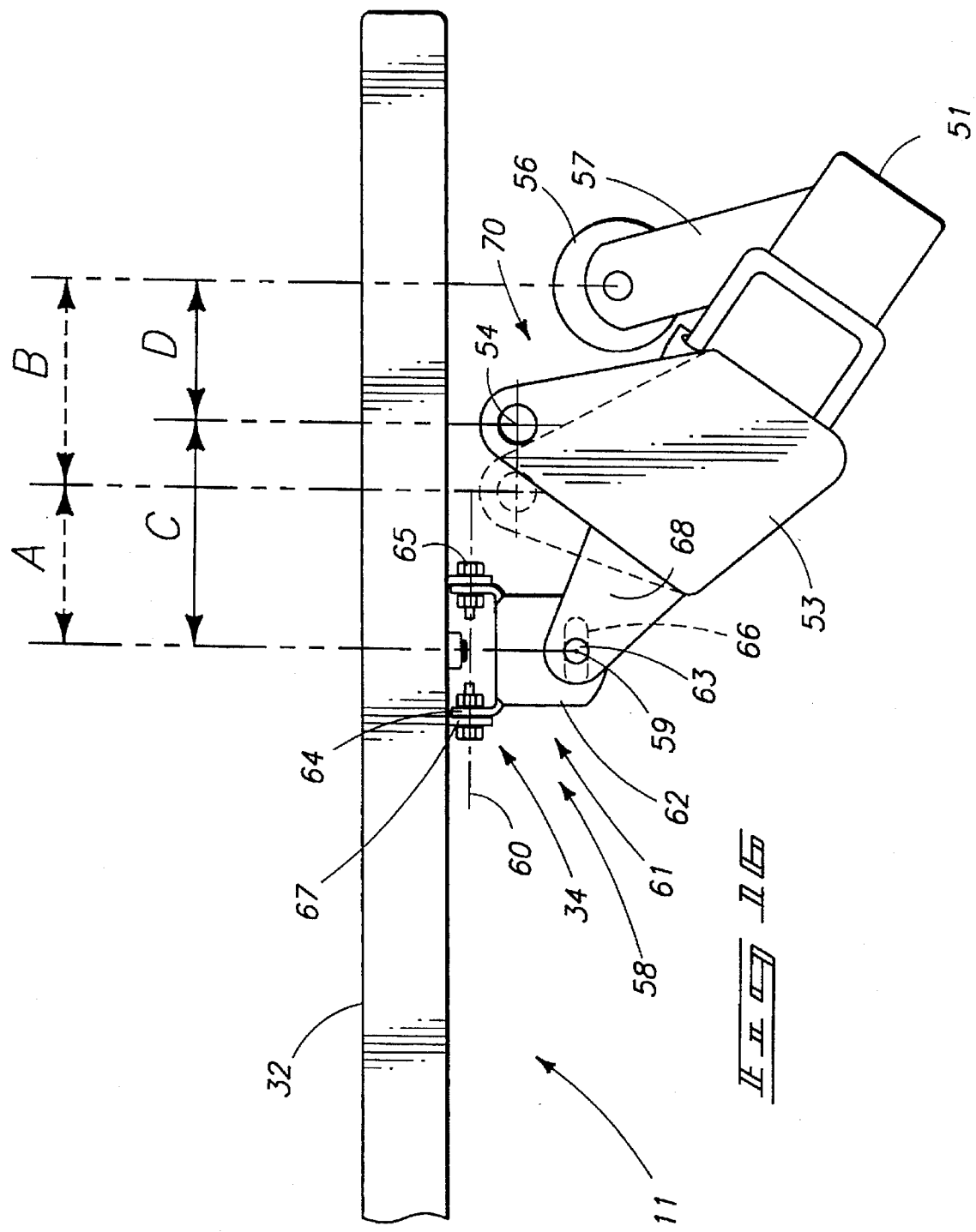

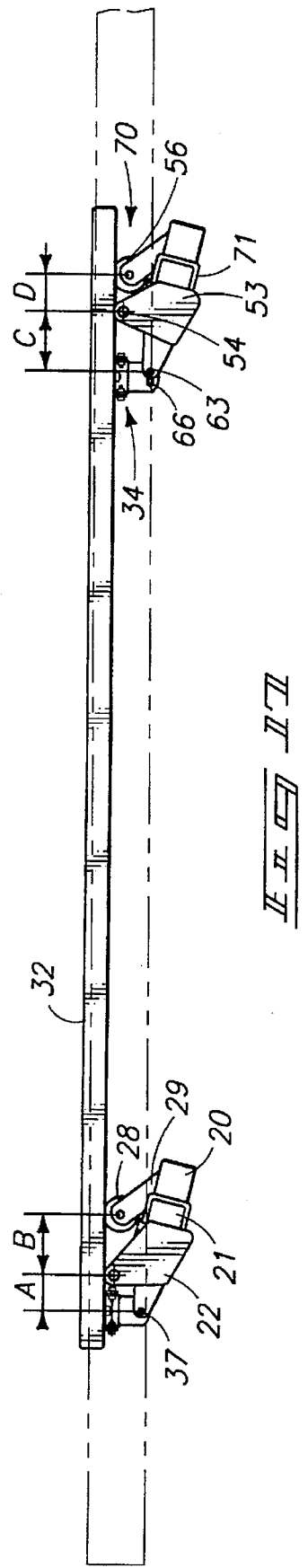

5,634,761

WEIGHT DISTRIBUTING HULL AND KEEL SUPPORT FOR BOAT TRAILER FRAMES

TECHNICAL FIELD

The present invention relates to boat transporting trailers, and more particularly to hull engaging and supporting elements in such trailers.

BACKGROUND OF THE INVENTION

Numerous boat trailers have been developed in the past with specific accommodations for receiving and distributing the weight of a boat between rollers or elongated flexible "bunks" engaging the boat hull.

The keel area of a boat is typically designed to be relatively strong, while the hull areas are much more fragile. It is therefor desirable for the support devices in a boat trailer to engage the boat hull over a fairly large surface area to provide partial support and to support the remainder of the boat along the keel area.

It is desirable to provide a share of support along the keel, because the keel is typically the strongest area on a boat. However, it represents only a small fraction of the total surface area for potential support. When only keel support is provided, stability of the boat on the trailer is minimal. An "ideal" support will proportion the received weight of the boat in a desired relationship between keel supports and hull supports.

U.S. Pat. No. 5,255,933 granted to the present applicant discloses a much needed solution to the above problem by provision of a boat hull support arrangement that will automatically adapt to individual hull configurations while maintaining a desired weight support ratio between the hull and keel engaging members thereof.

A need remains, however, for such a trailer with the above qualities, but with improvements that will facilitate loading and unloading of boats in relatively shallow water, or in areas where the trailer cannot be backed far into the water for loading or unloading purposes.

BRIEF DESCRIPTION OF THE DRAWINGS

Preferred and alternate embodiments of the present invention are illustrated in the accompanying drawings, in which:

FIG. 4 is an enlarged, fragmented side view of a rear portion of preferred form of the present improvement;

FIG. 5 is an enlarged, fragmented side view of a front portion of a preferred form of the present improvement;

FIG. 6 is a view similar to FIG. 4 only showing a different operational position of the elements shown;

FIG. 7 is a view similar to FIG. 5 only showing a different operational position of the elements shown;

FIG. 14 is a view similar to FIG. 8 only showing the interconnected short and long bunk configurations without a weight shifting means;

FIG. 15 is a view similar to FIG. 8 only showing the long bunk and weight shifting means without the short bunk assembly;

FIG. 16 is an enlarged, fragmented view showing another preferred form of the weight shifting means;

FIG. 17 is a side elevation view illustrating the weight shifting means of FIG. 16 with the long bunks and without the short bunk assembly.

DETAILED DESCRIPTION OF THE PREFERRED EMBODIMENTS

Figure 1:
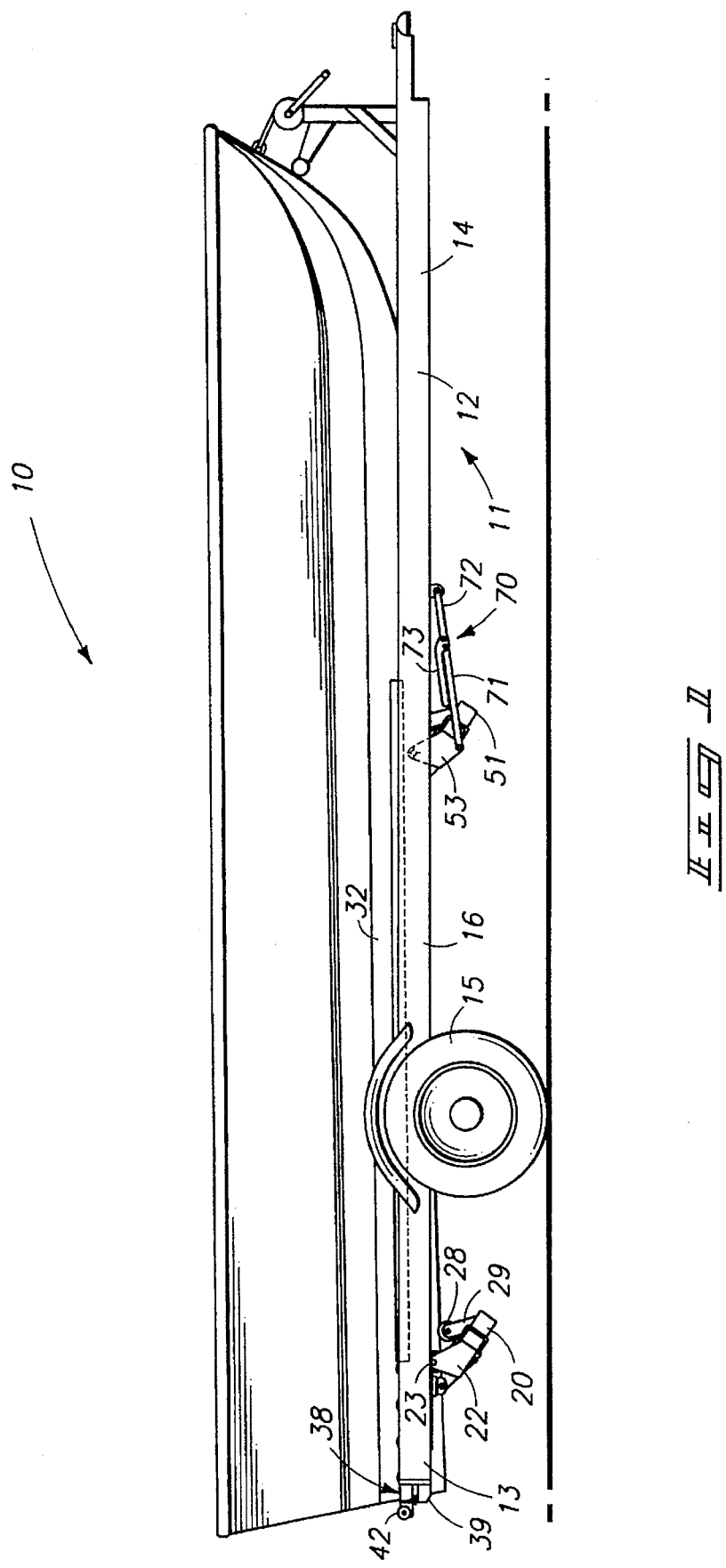
FIG. 1 is a side elevation view of a boat and trailer incorporating features of a first preferred form of the present invention.

This disclosure of the invention is submitted in furtherance of the constitutional purposes of the U.S. Patent Laws "to promote the progress of science and useful arts" (Article 1, Section 8).

A trailer embodying aspects of the present invention is shown in the accompanying drawings and is designated therein by the reference numeral 11. The boat trailer 11 incorporates an elongated rigid framework 12 that serves to mount the present improved hull and keel support generally designated at 10.

For purposes of further description, a brief description will be given with regard to the boat trailer frame 12. Briefly, the boat trailer 11 will typically include an elongated frame 12 extending between a rearward end 13 and a forward end 14. The exemplified trailer is supported by wheels 15 and includes transversely spaced longitudinal frame side members 16. Further details of the trailer frame will not be given, it being understood that such frames are well known to the industry. The elements described below may be utilized for a variety of such conventional boat trailer frame configurations.

In general, the present invention includes a pair of rigid rearward and forward cross members 20, 51 pivotably mounted to the trailer frame 12. Rearward cross member 20 is situated near the rear trailer end 13, and forward cross member 51 is located toward the forward trailer end 14.

The rearward cross member 20 extends transversely to the trailer frame between opposed ends 21 (FIGS. 2 and 3) that are mounted by brackets 22 to the elongated trailer frame side members 16. The brackets 22 are mounted by bolts or other appropriate pivot connectors to facilitate pivotal motion of the rearward cross member 20 about a horizontal rearward fulcrum axis 23 (FIGS. 4 and 6) that is transverse to the longitudinal orientation of the frame 12.

In the illustrated examples, a keel receiver 28 is mounted to the rearward cross member 20 by means of a bracket 29 (FIGS. 4 and 6). The keel receiver 28 is advantageously in the form of a roller or pairs of rollers that are mounted to one side (preferably forward) of the rearward fulcrum axis 23. The keel receiver 28 is positioned substantially centrally on the rearward cross member 20 to receive and provide moveable support to a boat keel.

The exemplified forms also include elongated bunks 32 for receiving and engaging the boat hull. The elongated bunks 32 are operatively mounted at rearward ends to the rearward cross member 20 and are laterally spaced from the keel receiver 28. It is preferred that at least one pair of the elongated bunks be provided, with each member of the pair being spaced a lateral distance from the keel receiver 28.

The configuration of the elongated bunks 32 may vary as disclosed in U.S. Pat. No. 5,255,933 which is incorporated herein by reference. In the preferred form the elongated bunks 32 are flexible along their lengths. The bunks 32 extend along and are substantially parallel to the side members 16 of the boat trailer 11.

A mounting means 34 is provided in a preferred form for operatively connecting the elongated bunk members 32 to the cross members 20, 51 such that the cross members 20, 51 are linked together by the elongated bunk members 32. Weight of the boat is distributed to the trailer frame by elements described below between the mounting means 34 and the cross members.

Mounting means 34 includes longitudinally spaced paired hinge assemblies 35 mounting rearward ends of the elongated bunks 32 to forward ends of rigid elongated longitudinal yokes 39, one of which is provided for each elongated bunk 32. The hinge assemblies 35 are positioned at forward ends of the yokes 39, forward of the fulcrum axis 23.

The hinge assemblies 35 permit the elongated bunks 32 to pivot on longitudinal axes 31 to conform angularly to various hull configurations. However, each of the paired hinge assemblies mount the associated bunk 32 and yoke 39 rigidly along their lengths, so the yokes 39 become substantially a rigid extension of the bunks 32. This is done to strengthen the connection between the yokes and bunks, and to hold the rearward ends of the bunks 32 substantially parallel to the yokes 39 at all times.

The yokes 39 are paired on the rearward cross member 20, each being spaced to an opposite lateral side of the keel receiver 28. The pair of elongated yokes 39 are pivotally mounted at yoke pivots 37 to the rearward cross member 20 and extend longitudinally between forward and rearward yoke ends. In a preferred form, the yokes 39 longitudinally overlap the rearward fulcrum axis 23, with the yoke pivots 37 being situated rearwardly of the fulcrum axis 23.

In one preferred form, rearward ends of the yokes 39 mount short bunks 38. The short bunks 38 are pivotably mounted to the yokes 39, rearwardly of the fulcrum axis 23 and the yoke pivots 37. The short bunks 38 pivot relatively freely on transverse short bunk pivot axes 40, defined by pivot pins 44. The short bunk pivot axes 40 are preferably substantially parallel to the rearward fulcrum axis 23, and to the yoke pivots 37.

Figure 9:
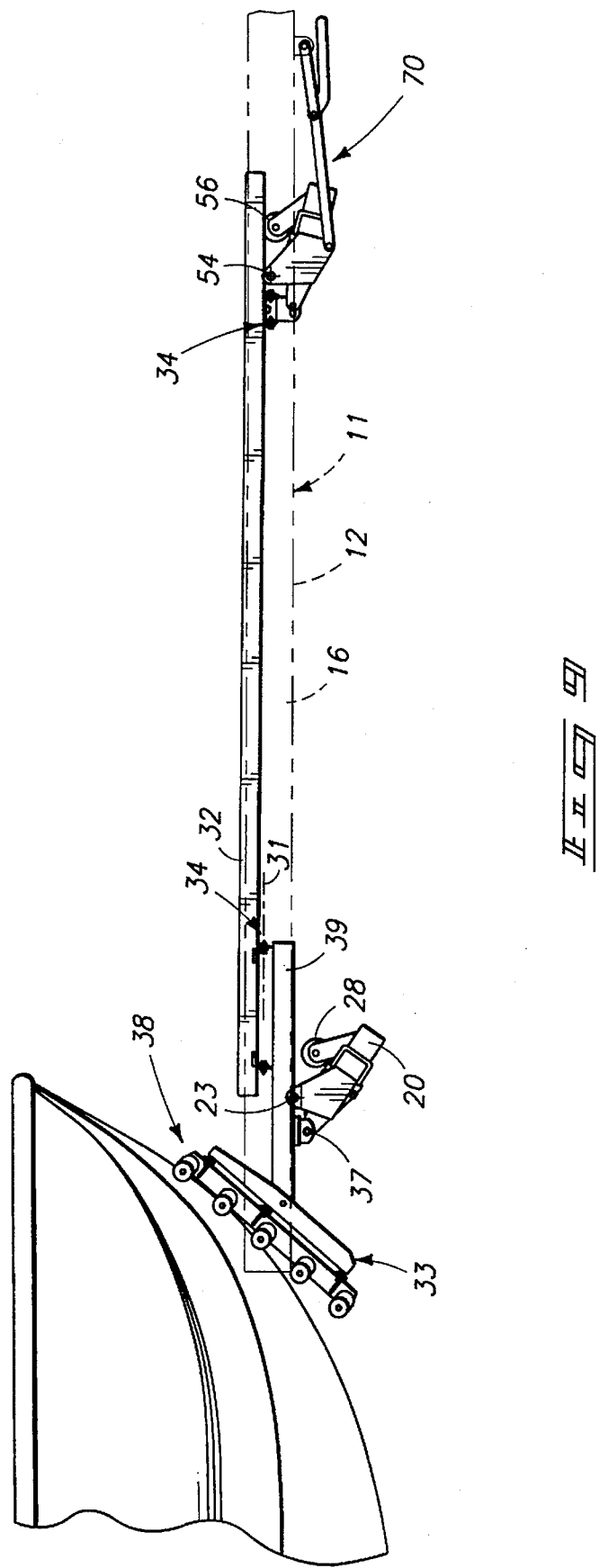
FIGS. 9–11 are diagrammatic operational views showing a boat being loaded onto the present trailer.
Figure 10:
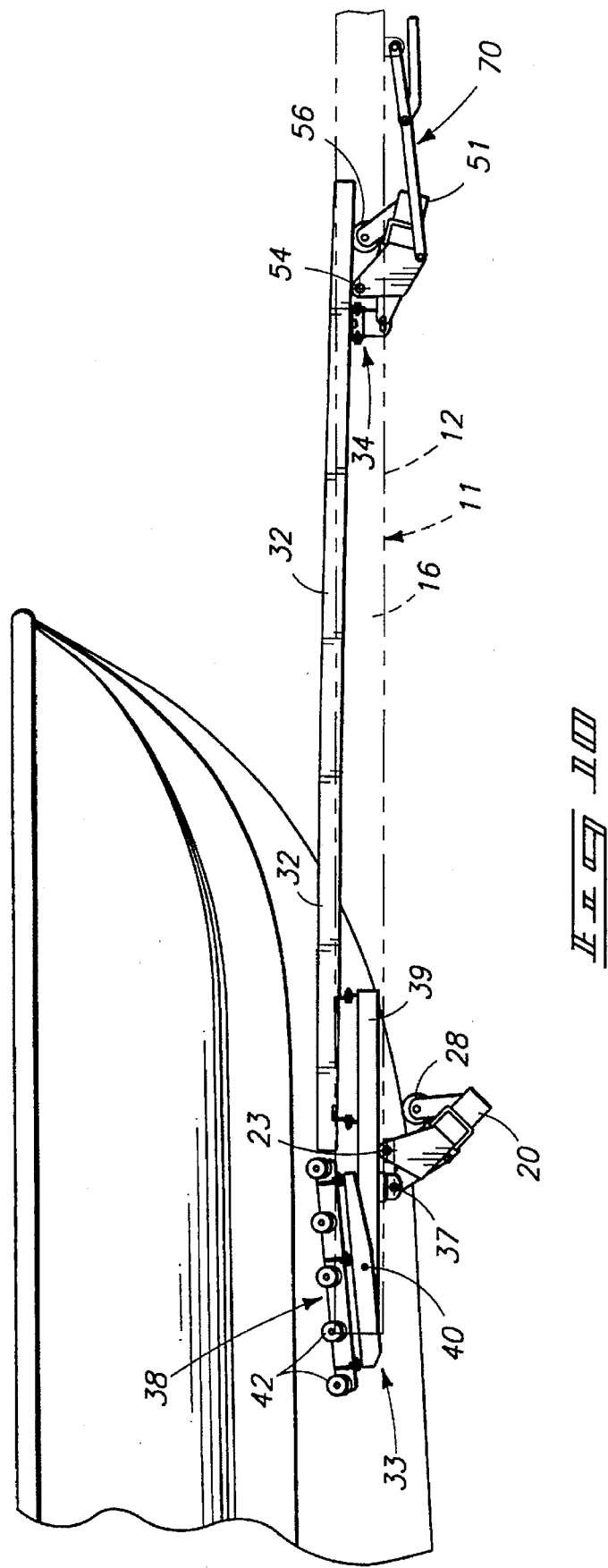
Figure 11:
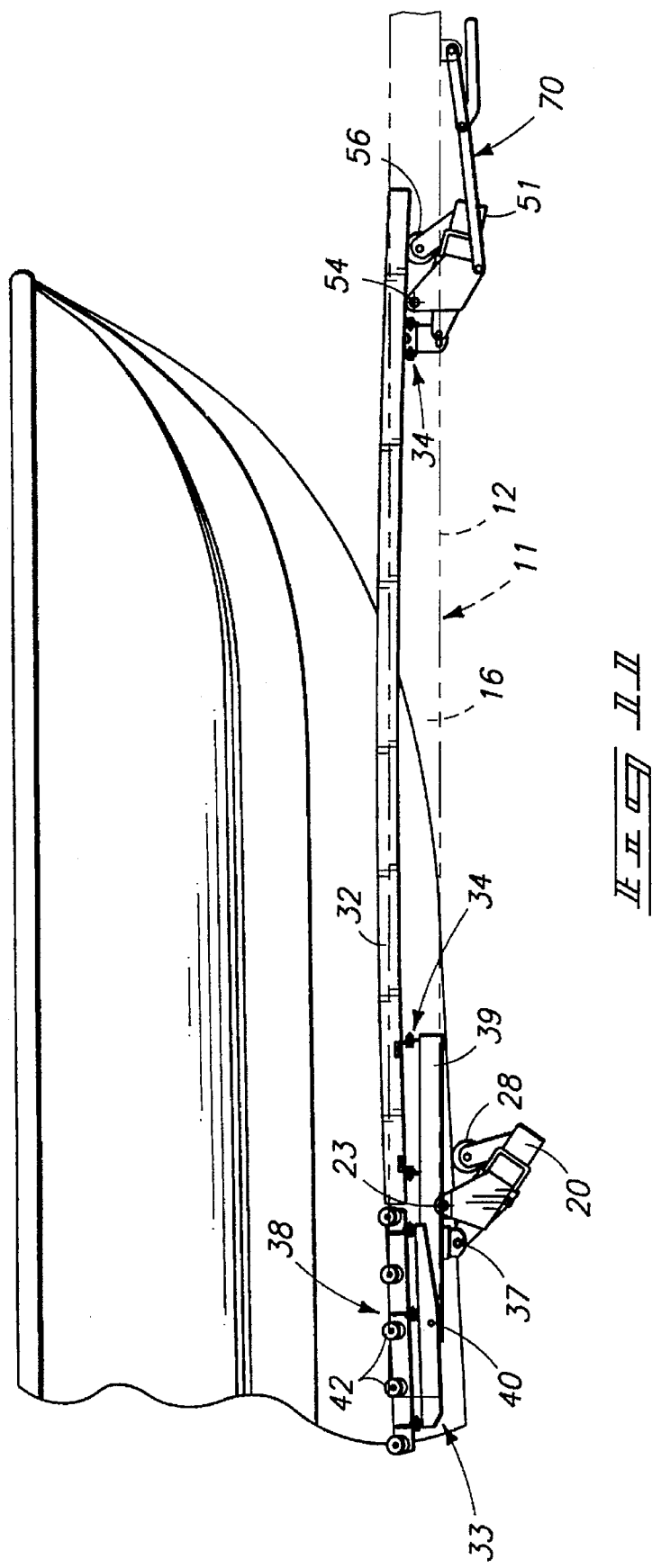

The short bunks 38 pivot on the transverse axes 40 between first positions (FIG. 4) in substantial longitudinal alignment with the elongated bunks, and angularly inclined second positions (FIG. 6). The short bunks 38, when in the angularly pivoted second positions are useful in the boat loading operation as shown in FIGS. 9-11.

Hull engaging members 33 are included on the short bunks 38 and pivot about longitudinal member pivot axes 41 that are substantially perpendicular to the rearward fulcrum axis 23 and the transverse short bunk pivot axis 40. The longitudinal pivot axes 41 are substantially horizontal in the loaded condition of the trailer, and are oriented longitudinally with respect to the elongated boat trailer frame 12. The axes 41 in this position are substantially coaxial with the long bunk axes 31. The angular orientations of the axes 41 will change as the bunks are moved about the short bunk pivot axes 40 (see FIG. 6).

In one preferred form, the hull engaging members 33 include a plurality of freely rotatable rollers 42. The rollers 42 are positioned to longitudinally align with the top support surfaces of the elongated bunks 32 (FIGS. 1, 4) when the trailer is loaded. The rollers 42 will thus engage a boat hull in the same manner as the elongated bunks 32 when a boat is loaded on the trailer 11.

Figure 12:
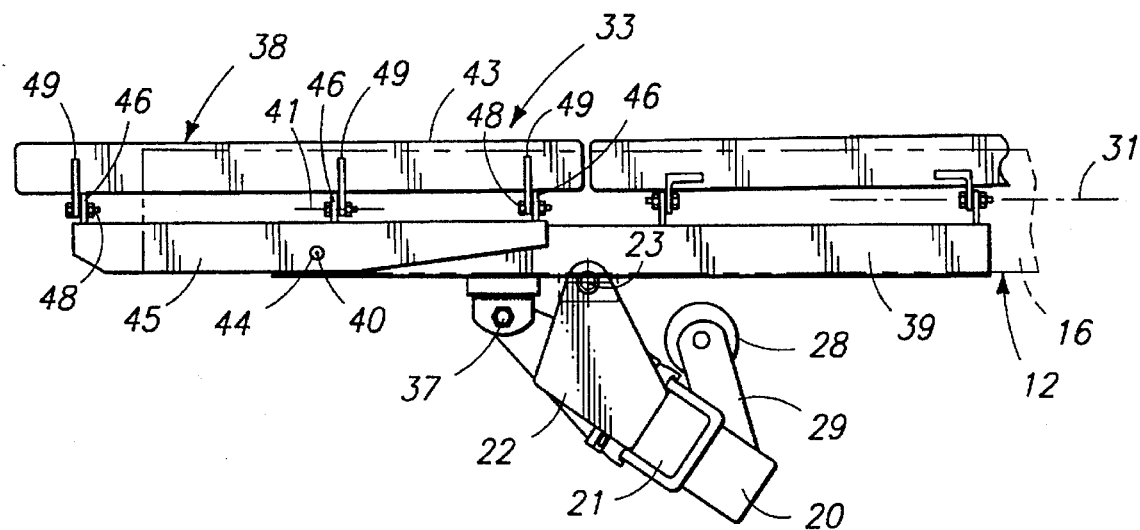
FIG. 12 is a view similar to FIG. 4 only showing the alternate form of short bunk.

In an alternate form (FIGS. 3 and 12), the hull engaging members include elongated flat boat hull engaging surfaces 43 mounted thereon. The surfaces 43 resemble the elongated bunks 32, but are substantially shorter, and are coplanar with the hull engaging surfaces of the longer bunks when a boat is fully loaded on the trailer.

In either form, the short bunk members 38 are pivotable on the rearward cross member 20 about the longitudinal short bunk pivot axes 41, and the yoke pivots 37.

Figure 13:
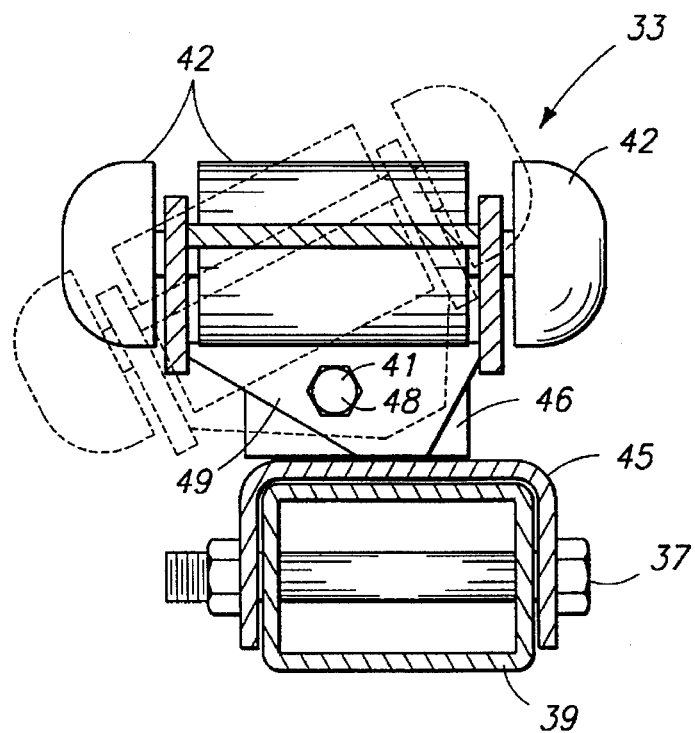
FIG. 13 is an enlarged sectional view taken substantially along line 13—13 in FIG. 4.

In the preferred embodiments, the short bunks 38 also include rigid elongated brackets 45 with transverse, centrally located pins 44. The pins 44 extend through the elongated brackets 45 and yokes 39 to define the transverse short bunk pivot axes 40 (FIGS. 4, 6, and 13).

The elongated brackets 45 are of an inverted "U" shape and are loosely fitted over the yokes 39. The brackets 45 also include upstanding hinge plates 46 with hinge pivot pins 48 that are mounted by brackets 49 to the hull engaging members 33. Pins 44, 48 define the respective transverse and longitudinal short bunk pivot axes 40 and 41. The longitudinal short bunk pivot axes 41 are substantially coaxial with the longitudinal pivot axis 31 of the elongated bunks 32, as defined by the hinged plates 35, when the trailer is loaded.

It is of interest to note the relative distance B (FIG. 4) between the keel receiver 28 and the rearward fulcrum axis 23, and the distance A from the yoke pivot 37 to the fulcrum axis 23. These distances determine the proportion of weight supported on the respective elongated and short bunks 32, 38 and keel receiver 28.

By way of example, it has been found to be advantageous to space the keel receiver 28 to a side of the rearward fulcrum axis 23 such that the keel receiver 28 will bear approximately forty percent of the boat weight at the rearward end of the trailer while the bunks 32, 38 bear approximately sixty percent of the load. This relationship may be changed as desired simply by adjusting spacing from the rearward fulcrum axis to the keel receiver 28 and yoke pivot 37.

It is also of significance to note that the transverse short bunk pivot axes 40 and yoke pivots 37 are parallel to the horizontal rearward fulcrum axis 23. By this provision, the axes 40 and pivots 37 will always remain in a horizontal orientation regardless of the pivoted position of the rearward cross member 20. Thus, the elongated bunks 32 and short bunks 38 may remain in an angular orientation capable of intimate contact with the boat hull, at any pivoted position of the rearward cross member 20 and the keel receiver 28. This feature thus lends the ability for the present support system to instantaneously and automatically adapt to various boat hull configurations.

In preferred forms, a forward cross member 51 (FIGS. 5, 7, 16) is provided. Mounting brackets 53 are provided at ends of the cross member 51 to mount the forward cross member 51 for pivotal motion about a forward fulcrum axis 54. The forward fulcrum axis 54 is parallel to the rearward fulcrum axis 23. Axis 54, like the rearward fulcrum axis 23, is preferably horizontal, and transverse to the longitudinal orientation of the elongated frame 12.

A keel receiver 56 is provided on the forward cross member 51 at the center thereof and is mounted by brackets 57 to one side of the forward fulcrum axis 54. In the example shown, the spacing between receiver 56 and the forward fulcrum axis 54 is the same distance B as shown in FIG. 4 between the rearward fulcrum axis 23 and keel receiver 28.

Likewise, the distance A between fulcrum axis 54 and axis 59 is the same as shown between rearward fulcrum axis 23 and pivots 37.

As shown in FIG. 5, the mounting means 34 is provided with a gimbal means 58 defining first and second pivot axes 59, 60. Axis 59 is transverse to the trailer and substantially parallel to the rearward yoke pivots 37. An axis 60 is longitudinal and coincidental with axis 31 on each side of the trailer.

The axes 59, 60 are defined on each side of the trailer by pins 63 and 65 extending through (in the first preferred form) mating, paired gimbal flanges 62, 64 (FIGS. 5 and 16) of a gimbal core 61. The pins mount the gimbal core 61 between respective yoke brackets 67, 68 on the bunk 32 and forward cross member 51.

Flanges 62 in the first preferred form include longitudinal slots 66. Slots 66 function as means for permitting longitudinal deflection of the elongated bunks 32 responsive to loading and deflection thereof against the hull surface of a boat. Slots 63 also permit independent pivotal motion of the forward and rearward cross members 20, 51 about axes 54, 23 even though the members are connected by the elongated bunks 32.

This feature may be clearly understood by comparing FIGS. 5 and 7. The pin 63 in FIG. 5 is shown substantially midway along the slot 66. In FIG. 7, the bunk is shown under an unloading condition, such that the longitudinal spacing between the gimbal brackets at the opposite ends of the elongated bunks 32 is foreshortened.

The slot 66 accommodates the foreshortening by allowing the bunk 32, yoke bracket 67 and gimbal core 61 to slide rearwardly on pins 63. The capability for the bunk to pivot about the longitudinal short bunk pivot axes 41, and second axes 60 of pins 48, 65 remains the same in both conditions. Further, the load bearing relationship between the bunks 38, 32 and the keel receivers 28, 56 remains substantially the same.

The elongated bunks 32 are therefore free to deflect along their lengths within reasonable limits, by provision of the slots 66. Yet the elongated bunks 32 are independently moveable through arcs defined by the fulcrum axes 23, 54 of cross members 20 and 51 to independently vary elevational distances between the elongated bunks 32 and the keel receivers 28, 56 and thereby automatically adjust for hulls of various depths and bow-to-stern configurations.

Additionally, the pins 48, hinge assemblies 35, and pins 65 which define the longitudinal short bunk pivot axes 41, axis 31, and coincidental second pivot axis 60 permit pivotal motion of the short bunks 38 and elongated bunks 32 to still further enable adjustment of the bunk positions with respect to the boat hull configuration.

The various axes and the relationships thereof facilitate a wide variety of positioning for the bunk members and keel receivers to accommodate a similar variety of hull configurations.

Figure 2:
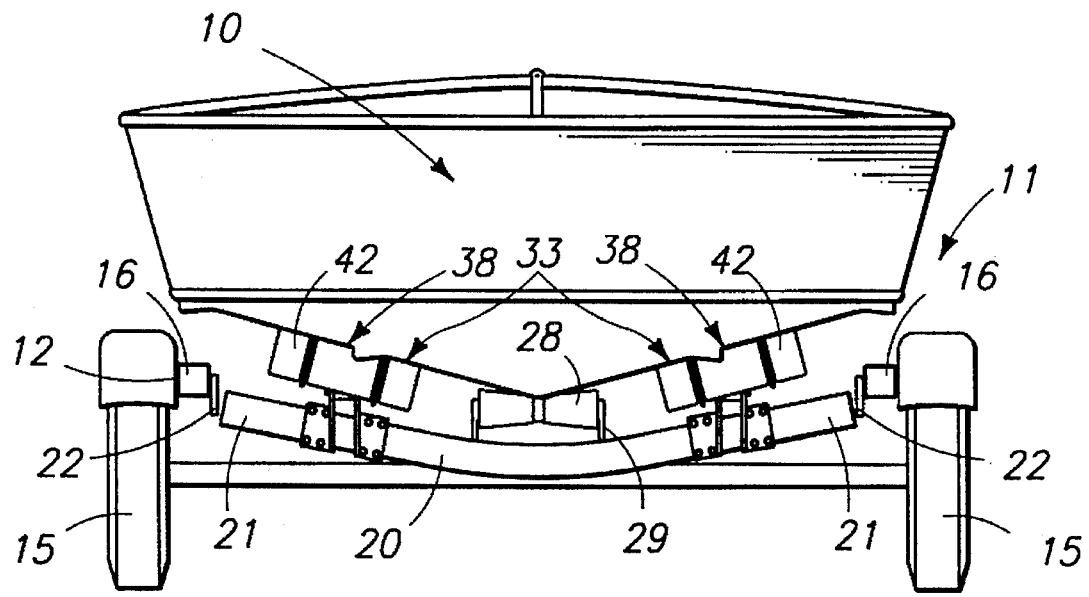
FIG. 2 is a rear view of the first preferred form with a boat mounted thereon.
Figure 3:
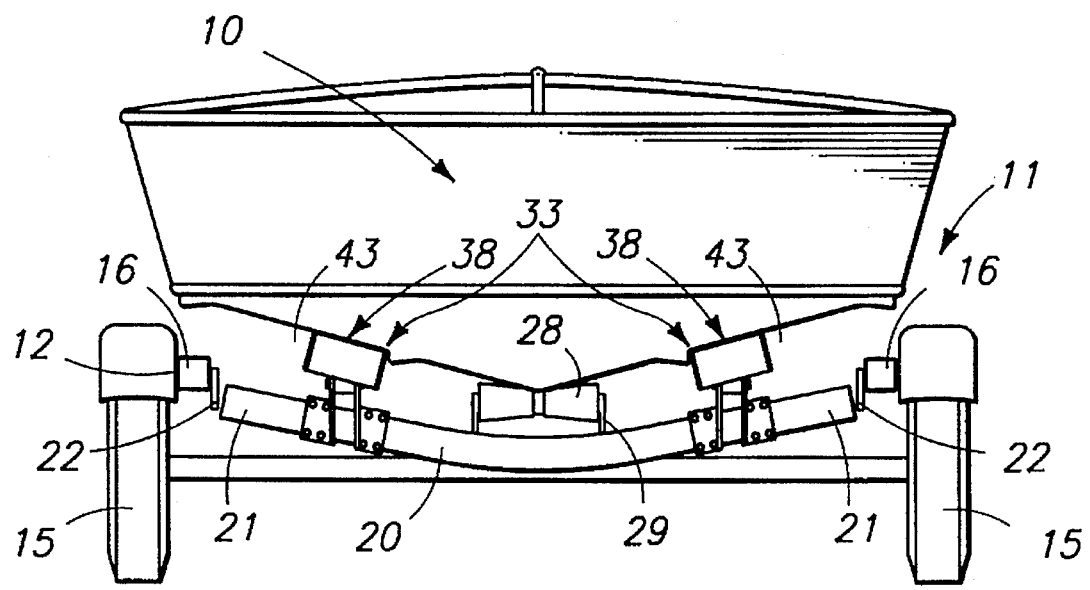
FIG. 3 is a rear view similar to that shown in FIG. 2, only showing an alternate form of short bunk engaging the transom end of a boat.

In the preferred form, weight of the boat hull supported between the bunks 32, 38 and the keel receivers 28, 56 will remain within a selected ratio. For example, should a weight distribution be desired as described above (approximately forty percent for the keel receivers 28, 56 and approximately sixty percent for the bunks 32, 38), that relationship will remain relatively consistent regardless of the elevational spacing between the keel supports and bunks. Thus the same weight distribution will be afforded to a relatively deep, "v" hull configuration, or to a sailboat with a relatively deep keel, or to a boat having a flat or shallow hull as shown in FIGS. 2, and 3. The bunks and keel receivers conform closely to the hull and keel while weight distribution remains relatively consistent.

FIG. 14 is illustrative of another exemplary embodiment of the present invention in which the keel supports 28, 56 and the long and short bunks 32, 38 are provided as described above. The supportive weight distributing apparatus is provided connecting the various bunks, keel supports, and cross members to the trailer frame. A trailer with this novel arrangement of components has been used experimentally to load, carry and unload boats of various weights and hull configurations. The load support and weight distribution advantages of the components was found to be substantially similar, if not identical, to that described in my U.S. Pat. No. 5,255,933. However, the present trailer was found to include distinct advantages in loading and unloading the boats, brought about by the combination including the yokes 39 and short bunks 38. FIG. 14 thus represents a first preferred form of the present invention.

Figure 8:
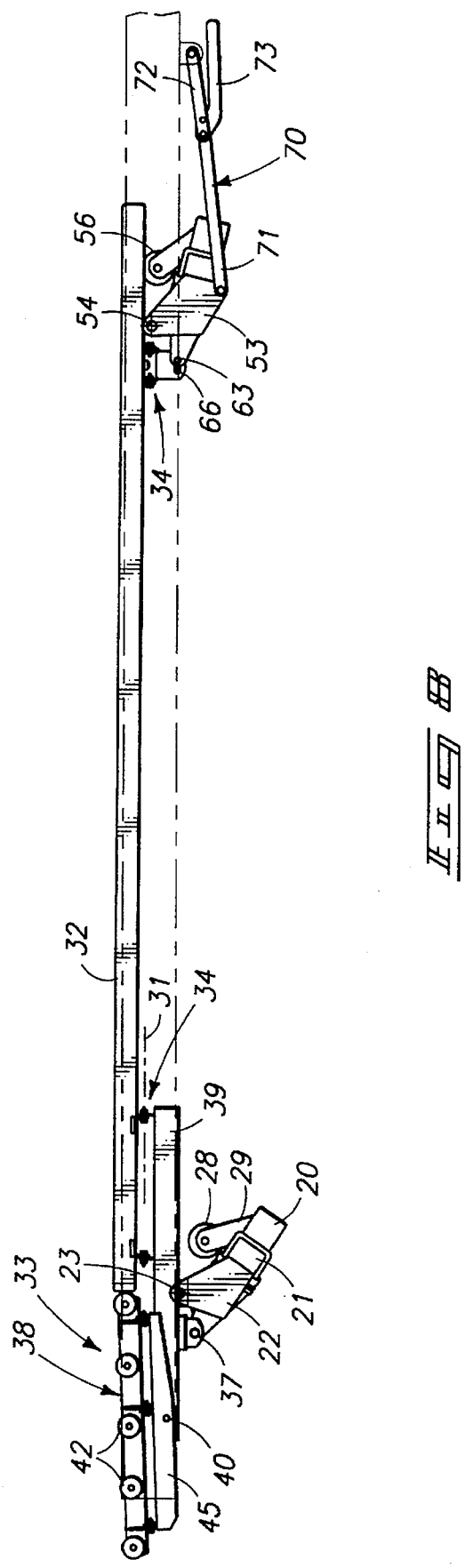
FIG. 8 is a fragmented view similar to FIG. 1 only showing the trailer unloaded.

It is believed that additional loading and unloading advantages may be gained by provision of a weight shifting means 70 connecting the forward cross member 51 to the trailer frame 11. In one preferred form, the weight shifting means 70 may be utilized in the combination shown in FIGS. 8 and 12.

Alternatively, means 70 may be combined with a bunk and keel receiver weight distribution arrangement similar to that disclosed in the above-incorporated '933 patent, and as shown in FIG. 15. In this embodiment, the short bunks 38 are eliminated and the rearward ends of the long bunks 32 are connected at the pivots 37, to the rearward cross member 20.

In a still further preferred form, the means 70 is integrated within the hull support structure by a novel arrangement of the support geometry, as exemplified in FIGS. 16 and 17. Though not shown, this arrangement could be substituted for the form of weight shifting means 70 in the combination shown in FIG. 15.

In any of the forms exemplified, the weight shifting means 70 is utilized (selectively or automatically) to shift the load shared by the bunks 32 and keel receiver 56 at the bow end of the boat, more to the keel receiver 56, making it easier to move the boat off the trailer. In doing so the weight ratio shared by the long bunks 32 and the keel receiver 56 at the bow end of the boat is shifted so more of the bow weight is borne by the keel receiver 56 than by the forward ends of the long bunks 32.

This is accomplished in the first preferred form (FIGS. 1, 5, 7, and 8) and by selectively pivoting the forward cross member 51 on the forward fulcrum axis 54. The pivoting cross member 51 will simultaneously lift the keel receiver 56 upwardly and lower the forward ends of the bunks 32. This novel arrangement requires minimal shifting of the bunks and receiver, since both are moved simultaneously in opposite elevational directions.

It is pointed out that the first preferred form of weight shifting means 70 is operated selectively to shift the front cross member (FIG. 7), but otherwise will allow the cross member to pivot freely on axis 54 (FIG. 5).

The first preferred weight shifting means 70 connects the forward cross member 51 to the frame 12 and is manually operable to selectively pivot the forward cross member 51 about the forward fulcrum axis 54. The keel receiving member 56 thus lifts the bow of the boat relative to the elongated bunk members 32 (which are simultaneously pivoted downwardly). Thus, a more substantial share of the bow weight is now shifted from the forward ends of the elongated bunks 32 to the keel receiving member 56 to facilitate unloading the boat. Since the bow end of the boat is also tipped upwardly, the center of gravity of the boat shifts slightly rearwardly, further facilitating unloading.

The first exemplified weight shifting means 70 is comprised of a linkage, more specifically an over-center linkage, for selective manual manipulation to pivot the forward cross member 51. The linkage includes two link members 71, 72. The link 71 is pivotably mounted to the forward cross member 51. Link 72 is pivotably mounted to the frame 12. An over-center link and handle 73 pivotably joins the link members 71 and 72 by way of pivot pins 74, 75. A slot in one of the link members will permit normal swinging movement of the cross member 51 when the handle is in the inoperative FIG. 5 position.

The handle can be manually pivoted from the position shown in FIG. 5 to the over-center position shown in FIG. 7 to swing the forward cross member 51 forwardly. This action simultaneously pivots the forward ends of the elongated bunks 32 downwardly, and the keel receiver 56 upwardly. The handle releasably locks in the FIG. 7 position, due to the over-center relationship of the pins 74, 75. A slot in one of the link members will permit normal swinging movement of the cross member 51 when the handle is in the inoperative FIG. 5 position, but will not permit such movement when in the operative position (FIG. 7).

Additionally, this arrangement effectively cancels the weight distribution effect normally present between the bunks 32 and keel receiver 56, by providing a rigid link between the otherwise freely pivotable cross member 51 and the trailer frame 11.

Another form of the weight shifting means 70 is exemplified in FIGS. 16 and 17. Here, the weight shifting operation is accomplished automatically by shifting the position of the forward fulcrum axis 54 in relation to the pivots 59, and keel receiver 56.

As shown in FIG. 16, the bracket 53 has been shifted forwardly from the position shown by dashed lines, to the position shown by solid lines. The dashed line position of bracket 53 is similar to that used in the embodiments described above, where approximately sixty percent of the bow weight is carried by the bunks 32, and approximately forty percent of the weight by the keel receiver 56. Shifting the bracket 53 forwardly as shown substantially reverses this weight distribution, so more of the bow weight of the boat is born by the keel receiver 56. It is preferred that such transfer be accomplished so at least half the bow weight is born by the keel receiver 56.

The distances A and B described above are shown graphically in FIG. 16 to allow comparison with the distances C and D of the alternate form of weight shifting means 70. As may be noted in FIG. 17, the distances A and B may remain as described at the rearward end of the frame where it may be more desirable to maintain a larger portion of the hull weight on the bunks 32 than on the keel receiver 28.

Operation of the present invention is relatively automatic, occurring as the associated boat is loaded onto or launched from the trailer. Operation will be described in general terms common to all the embodiments described, with differences being pointed out as needed where operative features vary.

The boat is loaded onto the trailer in the usual manner, by backing the trailer toward the shore line, connecting the bow of the boat to the typical winch line, and operating the winch to pull the boat onto the trailer.

In the forms such as shown in FIGS. 15 and 17, the hull will be pulled between the bunks 32. The bunks will flex and pivot about the forward and rearward fulcrum axes to accommodate the hull as it is pulled onto the trailer.

As the boat is loaded onto the trailer versions having short bunks (FIG. 9), the hull will first engage either or both of the short bunks 38, which have been tipped to their angular positions as shown. The boat hull will thus first engage and cause the short bunks 38 to swing so their rollers or support surfaces come into full contact with the boat.

The short bunks 38 thus serve to center the boat relative to the trailer. They also function as a ramp, guiding the boat upwardly and forwardly as it is pulled onto the trailer 11. They will pivot on pins 44 and axes 41 to stay in flush contact with the boat hull.

The short bunks 38 pivot as the boat continues up and forwardly to fully yet movably support the forward weight of the boat. The short bunks 38 keep the bow of the boat from scuffing over the rearward ends of the elongated bunks 32, by carrying the bow up and forwardly until it settles downwardly onto the elongated bunks 32, forward of the rearward bunk ends (FIGS. 10, 11).

In any of the described forms, the elongated bunks 32 will automatically conform to the hull configuration as the hull is pulled on forwardly. This is due to the connection of the elongated bunks 32 to the yokes 39, and the normally aligned condition of the bunks and rollers 42 or support surfaces 43 (which ever are being used).

The successive keel receivers 28, 56 will come into contact with the boat keel and accept their portion of the weight applied by the boat hull as the boat is pulled onto the trailer.

The load distribution proportions will be maintained throughout transport and storage conditions due to the consistent geometry of the relative pivot points and fulcrum axes. The elongated bunks 32 will consistently flex in intimate contact with the adjacent hull surfaces of the boat, while the short bunks 38 pivot to conform as well.

Firm contact between the rollers or support surfaces on the short bunks 38 and the boat hull is assured as the rearward weight of the boat on the elongated bunks 32 levers the yokes 39 at pivots 37 to press the short bunks 38 firmly toward the hull.

Launching the boat is simply a reversal of the above loading procedures, with the exception that, if used, the weight shifting means 70 may be used to ease the launching operation.

To launch the boat, the user simply backs the trailer toward the shoreline, and stops at a position where the rearward end of the frame 12 projects over the water.

The user may now push the boat rearwardly along the bunks 32 and over the short bunks 38 into the water. The short bunks 38 will pivot to the angular position shown in FIGS. 6 and 9 as the bow of the boat leaves the elongated bunks, thereby preventing the rearward ends of the elongated bunks 32 from scuffing along the bow. The boat is now launched.

If the trailer is equipped with the weight shifting means 70, the user may elect to rotate the over-center handle 73 forwardly before unloading the boat. As this happens, the forward keel receiver 56 pivots upwardly and the forward ends of the elongated bunks 32 simultaneously pivot downwardly.

The receiver 56 thus tips the bow of the boat slightly upward, relieving some of the surface contact with the elongated bunks 32, and shifting more of the boat's weight rearwardly onto the short bunks 38. This reduces the frictional resistance between the boat hull and the elongated bunks 32 and enables the boat to slide more freely from the trailer.

Launching using the weight shifting means 70 described in conjunction with FIGS. 16 and 17 involves steps similar to those described above, with an exception. The user is not required to selectively operate the weight shifting means 70, as such means functions automatically. In this form, a desired portion of the bow weight is already carried by the keel receiver 56 so the boat may be easily pushed rearwardly from the trailer into the water.

Operation to load and unload a boat from the embodiment shown in FIG. 15 is accomplished in a manner similar to that discussed in the above-referenced '933 patent, except that the weight shifting means 70 may be advantageously used in this combination to ease unloading the boat. Operation of the weight shifting means 70 is substantially the same as described above.

In compliance with the statute, the invention has been described in language more or less specific as to features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A boat trailer, comprising:
   an elongated wheel supported frame extending between forward and rearward frame ends;
   a pair of cross members including a forward cross member located toward the forward frame end, and a rearward cross member located toward the rearward frame end;
   said forward and rearward cross members being mounted to the boat trailer frame for pivotal movement thereon about respective forward and rearward fulcrum axes that are transverse to the boat trailer frame and spaced apart longitudinally thereon;
   a keel receiver on each cross member extending to one side of the associated fulcrum axis;
   a pair of elongated bunk members extending longitudinally relative to the boat trailer frame;
   mounting means for pivotally connecting the elongated bunk members to the cross members such that the cross members are linked together by the elongated bunk members;
   a pair of short bunk members operably mounted to the rearward cross member on a transverse short bunk pivot axis transverse to the boat trailer frame; and wherein the transverse short bunk pivot axis is rearward of the rearward fulcrum axis.

2. A boat trailer, as claimed by claim 1 wherein the short bunk members are pivotable on the transverse short bunk pivot axis between first positions in substantial longitudinal alignment with the elongated bunks, and angularly inclined second positions.

3. A boat trailer, as claimed by claim 1 wherein the short bunk members include hull engaging members that are pivotable about longitudinal member pivot axes; and
   wherein the short bunk members are also pivotable on the short bunk pivot axis between first positions in substantial longitudinal alignment with the elongated bunks, and angularly inclined second positions.

4. A boat trailer, as claimed by claim 1 wherein the short bunk members include hull engaging members that are pivotable about longitudinal member pivot axes.

5. A boat trailer, as claimed by claim 1 wherein the short bunk members are pivotable on the short bunk pivot axis between first positions in substantial longitudinal alignment with the elongated bunks, and angularly inclined second positions; and
   wherein the short bunk members include hull engaging members comprised of a series of rollers.

6. A boat trailer, as claimed by claim 1 wherein the short bunk members are pivotable on the short bunk pivot axis between first positions in substantial longitudinal alignment with the elongated bunks, and angularly inclined second positions; and
   wherein the short bunk members include hull engaging members comprised of substantially flat hull engaging surfaces.

7. A boat trailer, as claimed by claim 1 wherein the elongated bunks are flexible and extend longitudinally between the cross members and are connected to the cross members at sides thereof opposite to the keel receivers.

8. A boat trailer, as claimed by claim 1 wherein the elongated bunks are mounted to the rearward cross member forward of the rearward fulcrum axis.

9. A boat trailer, as claimed by claim 1 further comprising weight shifting means mounted between the forward cross member and the frame for affecting a weight distribution between the elongated bunk member and keel receiving member such that selected proportions of weight carried by the elongated bunk member and keel receiving member at the forward fulcrum axis is different than proportions of weight carried by the elongated bunk member and keel receiving member at the rearward fulcrum axis.

10. A boat trailer, comprising:
    an elongated wheel supported frame extending between forward and rearward frame ends;
    a pair of cross members including a forward cross member located toward the forward frame end, and a rearward cross member located toward the rearward frame end;
    said forward and rearward cross members being mounted to the boat trailer frame for pivotal movement thereon about respective forward and rearward fulcrum axes that are transverse to the boat trailer frame and spaced apart longitudinally thereon;
    a keel receiver on each cross member situated to one side of the respective fulcrum axis;
    a pair of elongated bunk members extending longitudinally relative to the boat trailer frame;
    mounting means for pivotally connecting the elongated bunk members to the cross members such that the cross members are linked together by the elongated bunk members;
    a pair of elongated yokes pivotably mounted at yoke pivots to the rearward cross member on a side thereof opposite the one side and extending longitudinally between forward and rearward yoke ends; and
    a pair of short bunk members mounted to the pair of elongated yokes on a transverse short bunk pivot axis transverse to the boat trailer frame.

11. A boat trailer as claimed by claim 10 wherein the yokes longitudinally overlap the rearward fulcrum axis.

12. A boat trailer as claimed by claim 10 wherein the yokes longitudinally overlap the rearward fulcrum axis and wherein the short bunk members are mounted to the yokes rearward of the yoke pivots.

13. A boat trailer as claimed by claim 10 wherein the yokes longitudinally overlap the rearward fulcrum axis and wherein the short bunk members are mounted to the yokes rearward of the yoke pivots, and wherein the yoke pivots are located rearward of the rearward fulcrum axis.

14. A boat trailer as claimed by claim 10 wherein the yokes longitudinally overlap the rearward fulcrum axis and wherein the elongated bunk members are mounted to the yokes forward of the rearward fulcrum axis.

15. A boat trailer as claimed by claim 10 wherein the yoke pivots are situated on a side of the rearward cross member opposite to the keel receiver thereon.

16. A boat trailer, as claimed by claim 10 further comprising weight shifting means mounted between the forward cross member and the frame for affecting a weight distribution between the elongated bunk member and keel receiving member such that selected proportions of weight carried by the elongated bunk member and keel receiving member at the forward fulcrum axis is different than proportions of weight carried by the elongated bunk member and keel receiving member at the rearward fulcrum axis.

17. A boat trailer, comprising:

an elongated wheel supported frame extending between forward and rearward frame ends;

a pair of cross members including a forward cross member located toward the forward frame end, and a rearward cross member located toward the rearward frame end;

said forward and rearward cross members being mounted to the boat trailer frame for pivotal movement thereon about respective forward and rearward fulcrum axes that are transverse to the boat trailer frame and spaced apart longitudinally thereon;

a forward keel receiver on the forward cross members normally extending forwardly of the forward fulcrum axis;

a rearward keel receiver on the rearward cross member normally extending forwardly of the rearward fulcrum axis;

a pair of elongated bunk members including forward and rearward bunk ends extending longitudinally relative to the boat trailer frame;

a pair of elongated yokes pivotably mounted at a yoke pivot to the rearward cross member rearward of the rearward fulcrum axis and extending longitudinally between forward and rearward yoke ends;

wherein the forward ends of the elongated bunks are mounted to the forward cross member normally rearwardly of the forward fulcrum axis;

wherein the rearward ends of the elongated bunks are mounted to the yokes adjacent the forward ends thereof; and a pair of short bunk members mounted to the pair of elongated yokes adjacent the rearward yoke ends on short bunk pivot axes transverse to the boat trailer frame and rearward of the rearward fulcrum axis.

18. A boat trailer, comprising:

an elongated wheel supported frame extending between forward and rearward frame ends;

a pair of cross members including a forward cross member located toward the forward frame end, and a rearward cross member located toward the rearward frame end;

said forward and rearward cross members being mounted to the boat trailer frame for pivotal movement thereon about respective forward and rearward fulcrum axes that are transverse to the boat trailer frame and spaced apart longitudinally thereon;

a keel receiver on each cross member extending to one side of the associated fulcrum axis;

a pair of elongated bunk members extending longitudinally relative to the boat trailer frame between forward and rearward ends;

mounting means for pivotally connecting the elongated bunk members at the forward and rearward ends thereof to the cross members such that the cross members are linked together by the elongated bunk members; and a weight shifting means mounted between the forward cross member and the frame for affecting a weight distribution between the elongated bunk members and keel receiving members such that selected proportions of weight carried by the elongated bunk members and keel receiving member at the forward fulcrum axis is different than proportions of weight carried by the elongated bunk members and keel receiving member at the rearward fulcrum axis.

19. A boat trailer, comprising:

an elongated wheel supported frame extending between forward and rearward frame ends;

a pair of cross members including a forward cross member located toward the forward frame end, and a rearward cross member located toward the rearward frame end;

said forward and rearward cross members being mounted to the boat trailer frame for pivotal movement thereon about respective forward and rearward fulcrum axes that are transverse to the boat trailer frame and spaced apart longitudinally thereon;

a keel receiver on each cross member extending to one side of the associated fulcrum axis;

a pair of elongated bunk members extending longitudinally relative to the boat trailer frame;

mounting means for pivotally connecting the elongated bunk members to the cross members such that the cross members are linked together by the elongated bunk members;

a pair of short bunk members operably mounted to the rearward cross member on a transverse short bunk pivot axis transverse to the boat trailer frame, and wherein the short bunk members are pivotable on the transverse short bunk pivot axis between first positions in substantial longitudinal alignment with the elongated bunks, and angularly inclined second positions.

20. A boat trailer, comprising:

an elongated wheel supported frame extending between forward and rearward frame ends;

a pair of cross members including a forward cross member located toward the forward frame end, and a rearward cross member located toward the rearward frame end;

said forward and rearward cross members being mounted to the boat trailer frame for pivotal movement thereon about respective forward and rearward fulcrum axes that are transverse to the boat trailer frame and spaced apart longitudinally thereon;

a keel receiver on each cross member extending to one side of the associated fulcrum axis;

a pair of elongated bunk members extending longitudinally relative to the boat trailer frame;

hinge assemblies pivotally connecting the elongated bunk members to the cross members such that the cross members are linked together by the elongated bunk members; and a pair of short bunk members operably mounted to the rearward cross member for pivotal movement on a transverse short bunk pivot axis transverse to the boat trailer frame.

* * * * *